US011850555B2

(12) United States Patent
Sun et al.

(10) Patent No.: US 11,850,555 B2
(45) Date of Patent: Dec. 26, 2023

(54) DUAL-LAYER MEMBRANE AND METHOD FOR PREPARING SAME

(71) Applicant: NANJING TECH UNIVERSITY, Jiangsu (CN)

(72) Inventors: Shipeng Sun, Jiangsu (CN); Zhenyuan Wang, Jiangsu (CN); Zhengjun Fu, Jiangsu (CN); Mengmeng Tang, Jiangsu (CN); Dandan Shao, Jiangsu (CN); Weihong Xing, Jiangsu (CN)

(73) Assignee: NANJING TECH UNIVERSITY, Jiangsu (CN)

( * ) Notice: Subject to any disclaimer, the term of this patent is extended or adjusted under 35 U.S.C. 154(b) by 262 days.

(21) Appl. No.: 17/218,181

(22) Filed: Mar. 31, 2021

(65) Prior Publication Data
US 2021/0308627 A1 Oct. 7, 2021

(30) Foreign Application Priority Data

Apr. 7, 2020 (CN) .......................... 202010264299.7

(51) Int. Cl.
*B01D 67/00* (2006.01)
*B01D 69/06* (2006.01)
(Continued)

(52) U.S. Cl.
CPC ....... *B01D 67/0016* (2013.01); *B01D 61/025* (2013.01); *B01D 61/027* (2013.01); *B01D 61/147* (2013.01); *B01D 67/0002* (2013.01); *B01D 67/0013* (2013.01); *B01D 69/06* (2013.01); *B01D 69/08* (2013.01); *B01D 69/088* (2013.01); *B01D 69/12* (2013.01); *B01D 69/125* (2013.01); *B01D 71/06* (2013.01); *B01D 71/56* (2013.01); *B01D 71/68* (2013.01); *B01D 71/78* (2013.01); *C02F 1/448* (2013.01);
(Continued)

(58) Field of Classification Search
CPC ......... B01D 69/12; B01D 71/64; B01D 71/78
See application file for complete search history.

(56) References Cited

U.S. PATENT DOCUMENTS

2012/0210869 A1* 8/2012 Finkler .................. B01D 71/60
210/640

FOREIGN PATENT DOCUMENTS

CN 104607056 A * 5/2015

OTHER PUBLICATIONS

Chen C—CN-104607056-A translation—May 2015 (Year: 2015).*
(Continued)

*Primary Examiner* — Bradley R Spies
(74) *Attorney, Agent, or Firm* — JCIP GLOBAL INC.

(57) ABSTRACT

A dual-layer membrane and a method for preparing thereof. By adding a modifying monomer containing an active group and a characteristic group to a dope solution or spinning solution during the preparation of the dual-layer membrane, the grafting reaction occurs between the active group of the monomer and the polymer in the dope solution or spinning solution, and the intermolecular interaction with other polymers is enhanced by the characteristic group of the monomer, to improve the miscibility between the polymers. The method is suitable for preparing both a dual-layer flat sheet membrane and a dual-layer hollow fiber membrane, and can realize the preparation of a dual-layer membrane with an interpenetrated structure at the interface under mild preparation conditions.

10 Claims, 7 Drawing Sheets

(51) Int. Cl.
    *B01D 71/56*     (2006.01)
    *B01D 71/64*     (2006.01)
    *B01D 71/68*     (2006.01)
    *B01D 61/02*     (2006.01)
    *B01D 61/14*     (2006.01)
    *B01D 69/08*     (2006.01)
    *B01D 69/12*     (2006.01)
    *B01D 71/78*     (2006.01)
    *C02F 1/44*     (2023.01)
    *D01D 5/24*     (2006.01)
    *D01D 5/34*     (2006.01)
    *D01F 1/08*     (2006.01)
    *B01D 71/06*     (2006.01)
    *B01D 53/22*     (2006.01)
    *B01D 61/00*     (2006.01)
    *B01D 61/36*     (2006.01)
    *D01D 5/06*     (2006.01)

(52) U.S. Cl.
CPC ............ *D01D 5/24* (2013.01); *D01D 5/34* (2013.01); *D01F 1/08* (2013.01); *B01D 53/228* (2013.01); *B01D 61/002* (2013.01); *B01D 61/02* (2013.01); *B01D 61/14* (2013.01); *B01D 61/145* (2013.01); *B01D 61/362* (2013.01); *B01D 2323/12* (2013.01); *B01D 2323/38* (2013.01); *C02F 1/441* (2013.01); *C02F 1/442* (2013.01); *C02F 1/444* (2013.01); *C02F 1/445* (2013.01); *D01D 5/06* (2013.01)

(56) References Cited

OTHER PUBLICATIONS

Tian-Zhi Jia et al., "Surface enriched sulfonated polyarylene ether benzonitrile (SPEB) that enhances heavy metal removal from polyacrylonitrile (PAN) thin-film composite nanofiltration membranes," Journal of Membrane Science, vol. 580, Jun. 15, 2019, pp. 214-223.

Qian-Cheng Xia et al., "A hydrophilicity gradient control mechanism for fabricating delamination-free dual-layer membranes," Journal of Membrane Science, vol. 539, Oct. 1, 2017, pp. 392-402.

* cited by examiner

DUAL-LAYER MEMBRANE AND METHOD FOR PREPARING SAME

CROSS-REFERENCE TO RELATED APPLICATION

This application claims the priority benefit of China application serial no. 202010264299.7, filed on Apr. 7, 2020. The entirety of the above-mentioned patent application is hereby incorporated by reference herein and made a part of this specification.

TECHNICAL FIELD

The present invention belongs to the technical field of membrane separation, and more particularly relates to a method for preparing a dual-layer membrane with excellent interfacial adhesion through a polymer modified with a monomer containing special functional groups.

BACKGROUND

As the core of a membrane separation technique, separation membranes are mainly classified into integrally skinned asymmetric structure membranes and composite membranes according to the membrane configuration. The integrally skinned asymmetric structure membranes are usually prepared by a phase inversion method, which has a simple preparation process that is beneficial to process scale-up. However, due to the limitation of the preparation method in which the selective separation layer and the support layer of the membrane are integrally phase-inverted from the same polymer material, the separation performance of the integrally asymmetric membranes is usually relatively low. Compared with the integrally skinned asymmetric membranes, the composite membranes have better separation performance as the structure and property of each layer thereof can be designed independently. However, the conventional composite membranes usually require a multi-step preparation process, leading to problems such as a long production cycle, high reagent consumption, and large investment in production equipment.

Dual-layer membranes prepared by a co-casting or co-extrusion technique have both advantages of the integrally asymmetric skinned membranes and the composite membranes, and are prepared by a simple one-step preparation process, while also having the structure form of the composite membranes with each layer being designed independently. For example, in the one-step co-extrusion process, by using a membrane material with excellent separation performance as the separation layer, and using a membrane material with low cost and excellent mechanical properties as the support layer, the optimized performance can be achieved at the lowest material cost for the dual-layer membranes.

Many factors such as the miscibility gap and the difference in mechanical properties between the two layers of polymer, and the problem of the matching of the film forming conditions of dope solutions (spinning solutions) for the two layers, or combined effects thereof may cause a weak interlayer adhesion of the dual-layer membranes, leading to delamination of the dual-layer membranes during preparation or application. The problems of reduced separation performance and shortened service life due to the delamination phenomenon of the dual-layer membranes have become a technical bottleneck hindering the development of dual-layer membranes.

SUMMARY

The present invention provides a dual-layer membrane with excellent interfacial adhesion prepared from a polymer grafted and modified with a monomer containing a special functional group, and provides a method for preparing the membrane and use of a modifier.

A First Aspect of the Present Invention Provides:

A dual-layer membrane, including a layer of a first polymer and a layer of a second polymer, and the layer of the first polymer further contains a modifier.

The first polymer is a high molecular weight polymer containing an imide structure, and the second polymer is a high molecular weight polymer containing a carbonyl group, a carboxyl group or an ether bond.

The first polymer includes polyimide, polyetherimide, polyamideimide or the like, and the second polymer includes polyetherimide, polyethersulfone, polysulfone or the like.

The modifier is a fluoro substituted aromatic amine monomer containing fluoro or fluoromethyl and amino groups.

The modifier is 4-fluoro-2-(trifluoromethyl)benzylamine.

The dual-layer membrane is of a flat sheet type or a hollow fiber type.

The dual-layer membrane includes a microfiltration membrane, an ultrafiltration membrane, a nanofiltration membrane, a reverse osmosis membrane, a pervaporation membrane, a vapor permeable membrane, a gas separation membrane or a forward osmosis membrane.

A Second Aspect of the Present Invention Provides:

A method for preparing the above dual-layer membrane, including the following steps:
  step 1: formulating a first polymer, a modifier, a first solvent, and a first additive into a first solution;
  step 2: formulating a second polymer, a second solvent, and a second additive into a second solution; and
  step 3: applying the first solution and the second solution in a manner of overlapping each other, followed by phase inversion, to obtain a separation membrane.

The step 3 is configured for preparing a flat sheet separation membrane, and includes the following steps: casting the first solution and the second solution on a support carrier through a co-casting technique to form a membrane, and allowing the membrane to enter a coagulation bath after a predetermined period of time to allow the phase inversion, to precipitate into a dual-layer flat sheet membrane.

The step 3 is configured for preparing a hollow fiber membrane, and includes the following steps: extruding the first solution, the second solution and a bore fluid from a spinneret through a co-extrusion technique, and allowing the co-extruded first solution, second solution and bore fluid to enter a coagulation bath after experiencing an air gap, to precipitate into a dual-layer hollow fiber membrane.

The first polymer, the modifier and the first additive in the first solution have content ranges of 10-35%, 0.1-20%, and 0-40%, respectively.

The second polymer and the second additive in the second solution have content ranges of 10-35%, 0-20%, respectively.

The coagulation bath is water.

The first solvent or the second solvent is one of NMP and THF, and the first additive or the second additive is LiCl.

A Third Aspect of the Present Invention Provides:

Use of the above dual-layer polymer membrane in liquid separation or gas separation.

Figure 4:
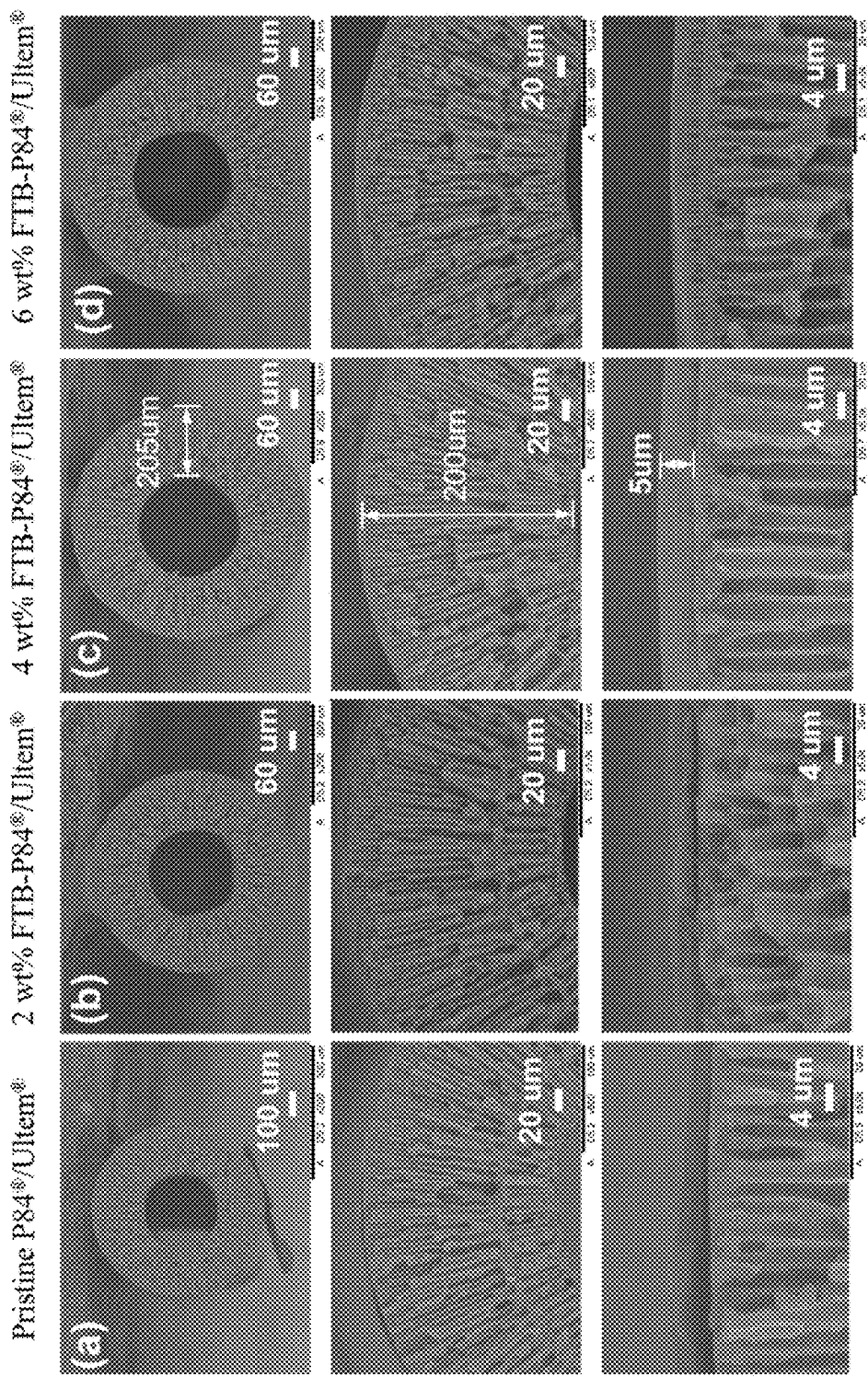

(a)-(d) of FIG. 4 show cross-section morphology of P84 polyimide/Ultem polyetherimide dual-layer hollow fiber membranes grafted and modified with 4-fluoro-2-(trifluoromethyl)benzylamine at different contents.

Figure 5:
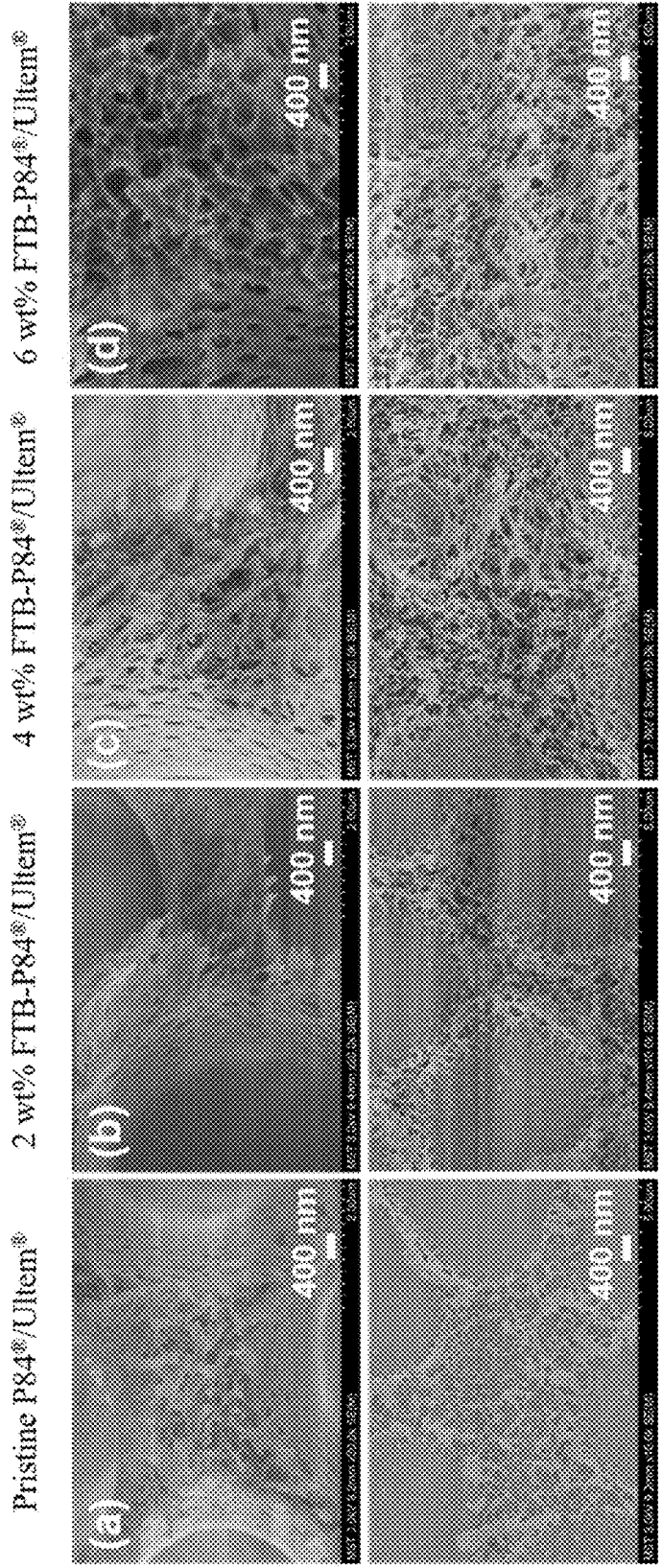

(a)-(d) of FIG. 5 show morphology at an interfacial region of dual-layer membranes.

Figure 6:
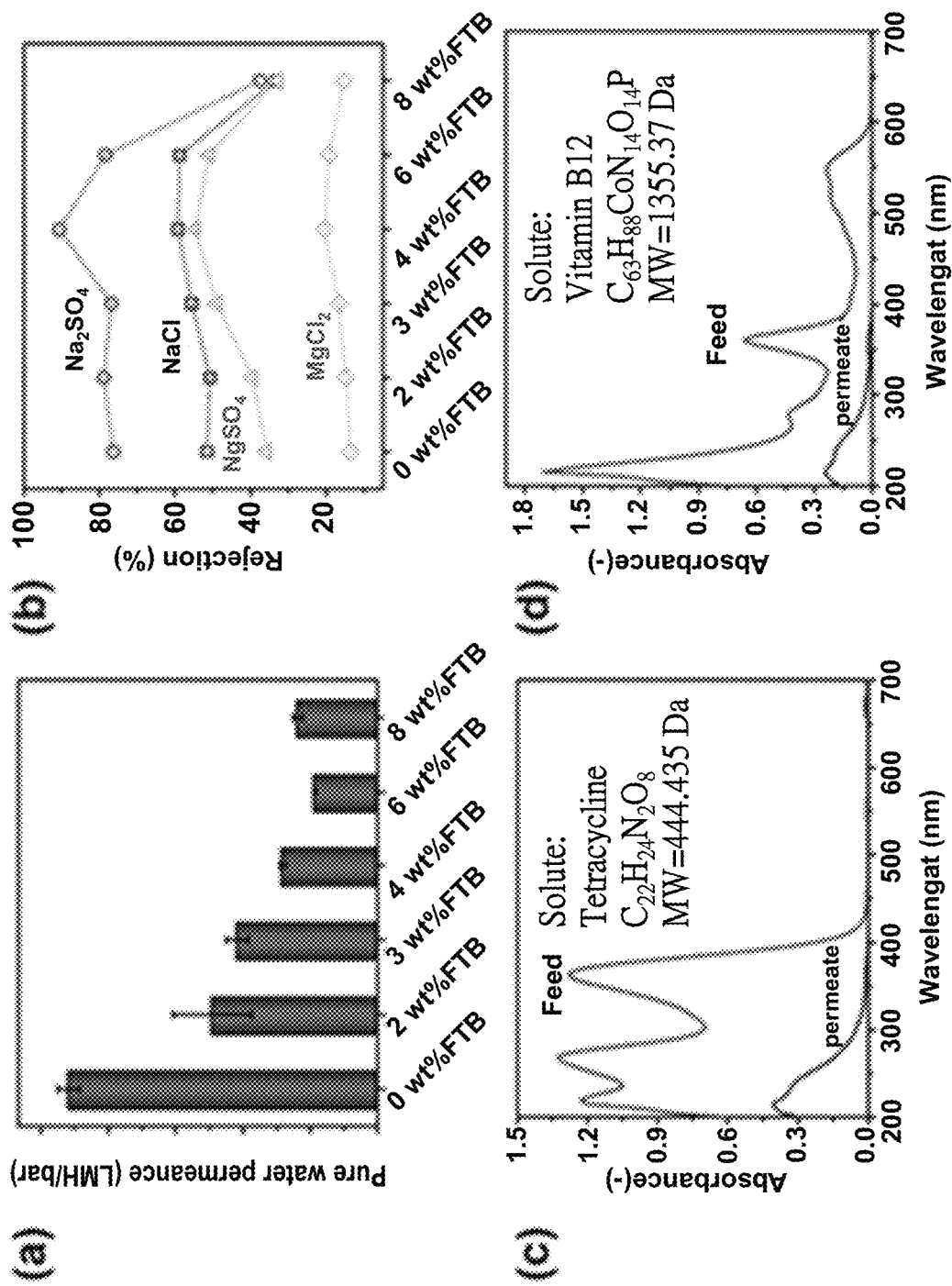

FIG. 6 shows the aqueous separation performance of the dual-layer hollow fiber NF membranes with varied FTB incorporating content: region (a) of FIG. 6 shows the pure water permeance; region (b) of FIG. 6 shows the rejections of different single salts; The solvent separation performance of 4 wt % FTB incorporated dual-layer hollow fiber membranes: region (c) of FIG. 6 shows UV-vis absorbance spectra of tetracycline solutions; and region (d) of FIG. 6 shows UV-vis absorbance spectra of Vitamin B12 solutions.

Figure 7:
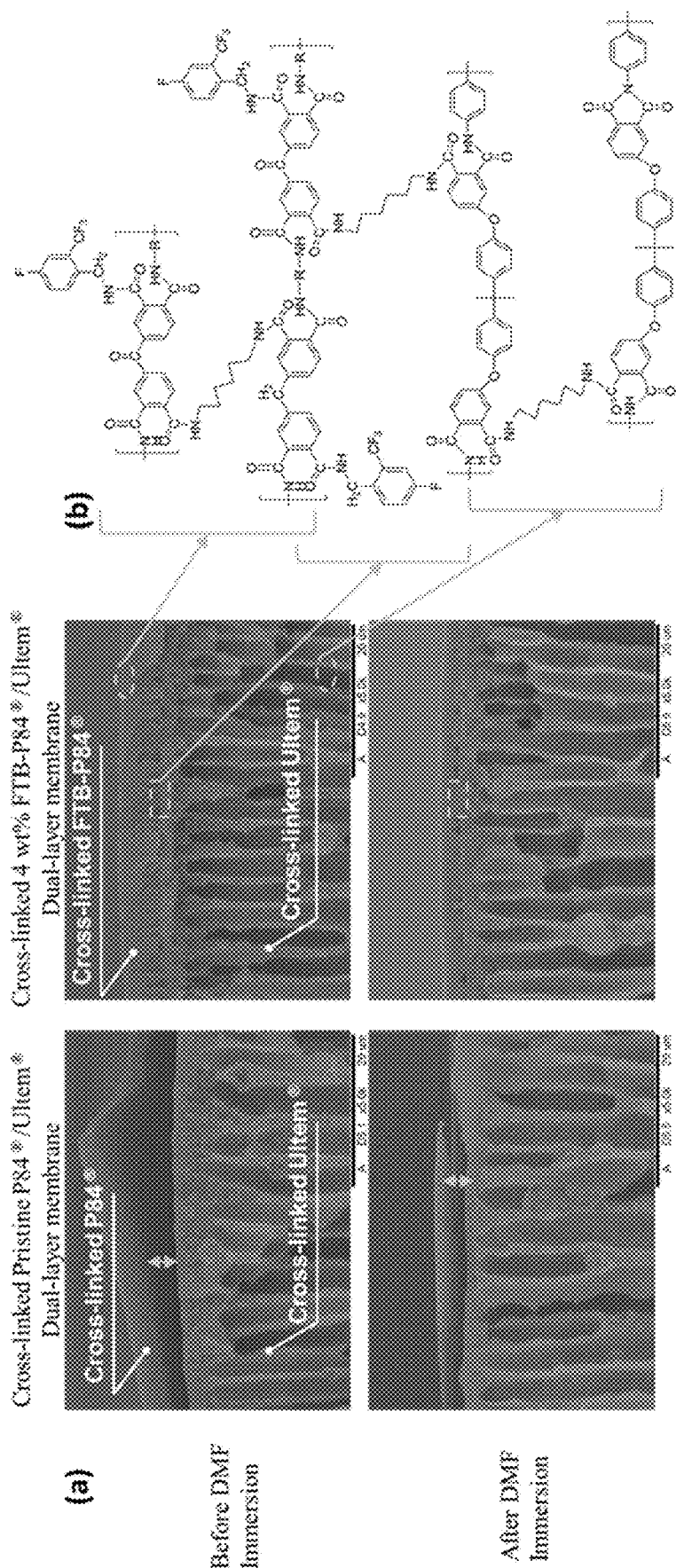

(a) of FIG. 7 shows SEM photographs and chemical structures of a cross-linked pristine P84®/Ultem® dual-layer hollow fiber membrane immersed in DMF.

(b) of FIG. 7 illustrates the possible reactions exist in the outer layer, inner layer and the interfacial region of the dual-layer membranes.

DETAILED DESCRIPTION OF THE EMBODIMENTS

The present invention proposes a method for preparing a dual-layer membrane with excellent interfacial adhesion through a polymer modified with a monomer containing a special functional group. In the present invention, by adding a modifying monomer containing an active group and a characteristic group to a dope solution or spinning solution during the preparation of the dual-layer membrane, the grafting reaction occurs between the active group of the monomer and the polymer in the dope solution or spinning solution, and the intermolecular interaction with other polymers is enhanced by the characteristic group of the monomer, to improve the miscibility between the polymers, thereby preparing the dual-layer membrane with excellent interfacial adhesion. The method is suitable for preparing both a dual-layer flat sheet membrane and a dual-layer hollow fiber membrane, and can realize the preparation of a dual-layer membrane with an interpenetrated structure at the interface under mild preparation conditions. By the interpenetrated structure at the interface, the prepared dual-layer membrane has an excellent interfacial adhesion and also has a lower mass transfer resistance.

Figure 1:
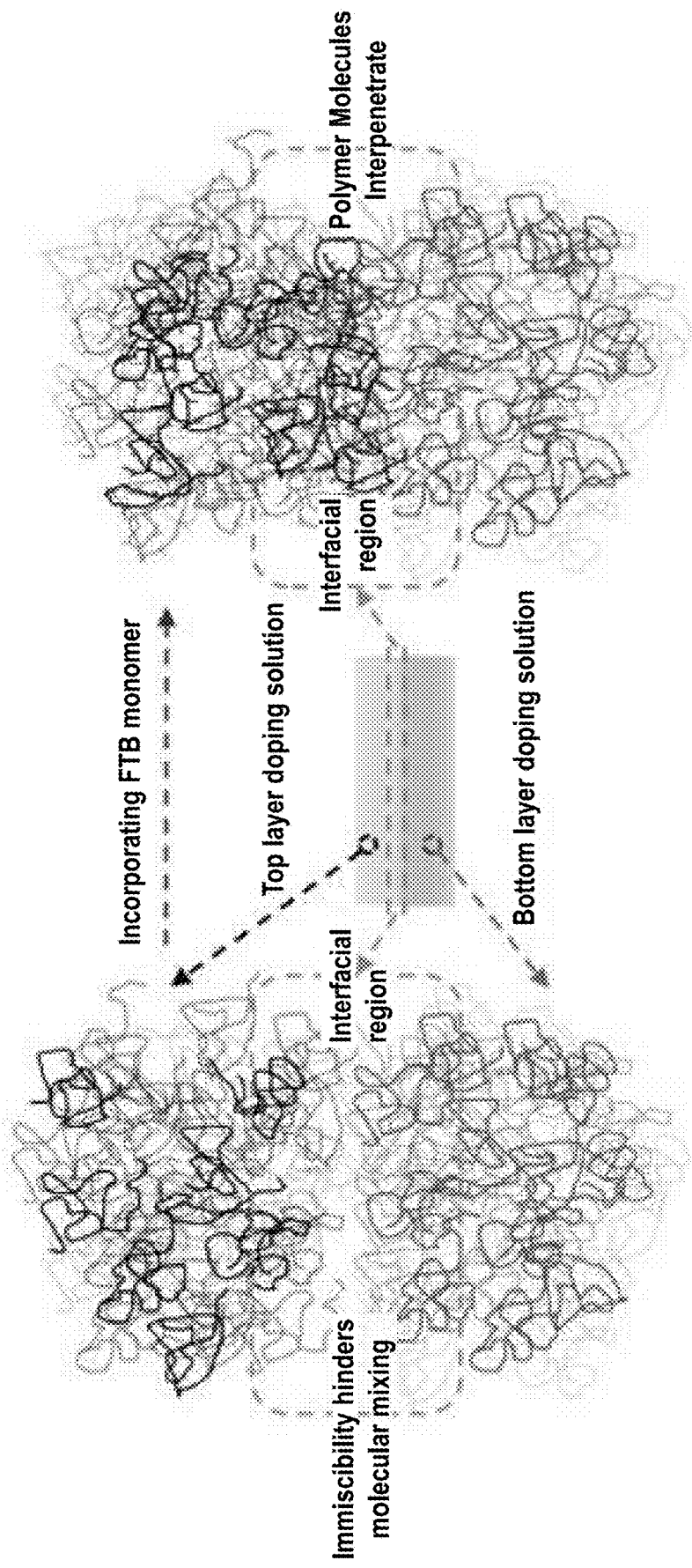
FIG. 1 is a schematic view of a dual-layer membrane prepared in the present invention.

Description of the Schematic View in FIG. 1:

In the conventional method for preparing a dual-layer membrane, due to the miscibility gap between polymers, or the problem of matching of parameters in the film forming process, the adhesion at the interface between two layers of the prepared dual-layer membrane is weak (the polymers at the interface are not easy to interpenetrate with each other), which tends to cause delamination.

In the present method, a polymer in one of two polymer layers (e.g., top layer) is grafted with the modifying monomer, and thus the miscibility between polymers in the two layers is improved and the intermolecular interaction thereof is enhanced, allowing the polymers at the interface of the two layers to interpenetrate with each other and forming the dual-layer membrane with excellent interfacial adhesion.

In the present invention, the top and bottom layer polymers do not refer to the upper and lower relationship in the spatial sense, but can also be defined as a layer of the first polymer and a layer of the second polymer, and are only used to define the spatial positional relationship of the two layers overlapping each other.

Based on the technical concept of the present invention, the first polymer should be a high molecular weight polymer containing an imide structure, such as polyimide, polyetherimide, and polyamideimide. The second polymer should be a high molecular weight polymer containing a carbonyl group, a carboxyl group or an ether bond, such as polyetherimide, polyethersulfone, and polysulfone. On this basis, the modifier employed should be a fluoro substituted aromatic amine monomer containing fluoro or fluoromethyl and amino groups. On the other hand, the incorporation of the modifier can improve the miscibility between the first polymer and the second polymer, and enhance the intermolecular interaction with the carboxyl and ether containing molecules in the second polymer to improve the miscibility and interpenetration between the two polymers, so that the interdiffusion between the polymers at the interface is enhanced during the film forming process of the dual-layer membrane. The interdiffusion and interpenetration between the polymers at the interface provide an excellent interfacial adhesion to the dual-layer membrane.

In the following examples, in the case of polyimide being grafted and modified with 4-fluoro-2-(trifluoromethyl)benzylamine, a polyimide/polyetherimide dual-layer membrane with excellent interfacial adhesion can be prepared, and a polyimide/polyethersulfone dual-layer membrane with excellent interfacial adhesion can also be prepared.

For example, the following raw materials may be employed:

Polymer A: P84® (polyimide)
Polymer B: Ultem® (polyetherimide)
Modifier: 4-fluoro-2-(trifluoromethyl)benzylamine (FTB)

P84® polyimide and Ultem®1000 polyetherimide are chosen as polymer candidates for the selective layer and the support layer, respectively, because (1) P84® is a high performance material for nanofiltration, which possesses rigid structure but the material cost is relatively high. Whereas, Ultem® possesses a moderate material cost with rather flexible and porous structure. (2) P84® and Ultem® have distinctive properties and poor miscibility, bringing about difficulties and challenges to realize the adhesion of P84®/Ultem® dual-layer membranes. A fluoro substituted aromatic amine monomer 4-fluoro-2-(trifluoromethyl)benzylamine is employed, wherein the presence of amine in the FTB can react with imide in the P84® molecule. The incorporation of the fluorine atoms with high electronegativity may alter the polarity of the P84® polymer and promote intermolecular interactions with carboxyl and ether contained in Ultem® molecules. The method can potentially expand the selection range of choosing immiscible polymers for preparing delamination-free dual-layer membranes. The interpenetrated structure at the interfacial region obtained by the method may further broaden the application filed of dual-layer membranes.

Their molecular formulas are shown as follows:
P84® polyimide

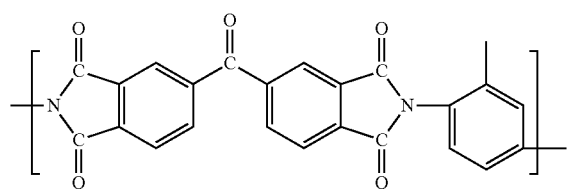

BTDA-TDA 80%

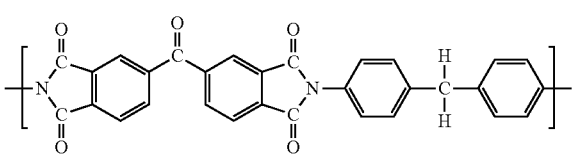

BTDA-MDA 20%
Ultem® polyetherimide

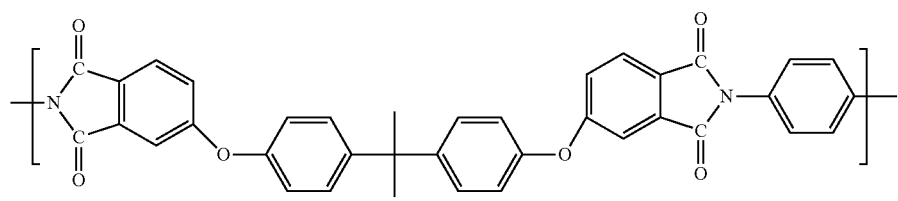

4-Fluoro-2-(trifluoromethyl) benzylamine

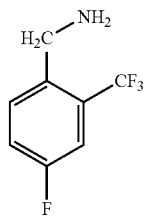 [SMILES: NCc1ccc(F)cc1C(F)(F)F]

The cross-linking and grafting process of FTB and P84 is shown as follows:

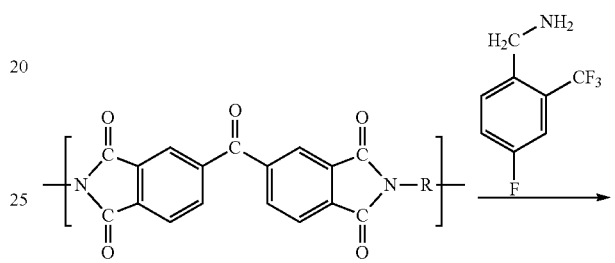

-continued

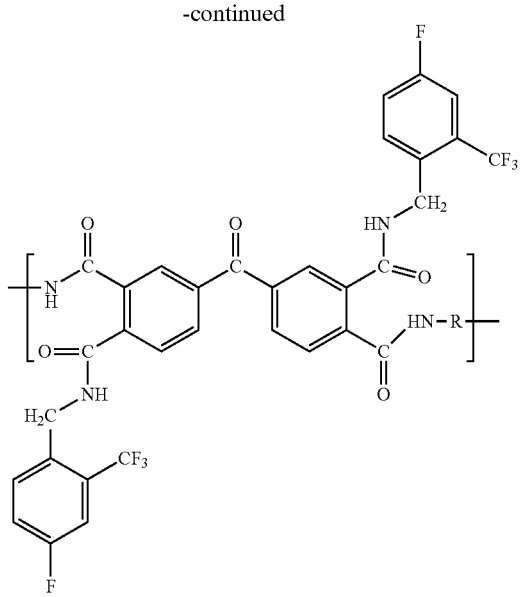

Based on the above process, the dual-layer membrane in the present invention refers to a dual-layer membrane composed of the first polymer and the second polymer overlapping each other, which is finally formed by sequentially applying the raw materials of two layers of the polymers in a synchronous manner. The structure of the dual-layer membrane here may refer to a flat sheet structure or alternatively a hollow fiber structure. In the case of the flat sheet structure, the dual-layer membrane is obtained by applying the solutions of the two polymers in a manner of overlapping each other on a support material through casting, followed by phase inversion. In the case of the hollow fiber structure, the dual-layer hollow fiber membrane may be obtained by extruding the solutions of the two polymers from a spinneret through co-extrusion, and extruding a bore fluid from the inside of the spinneret, followed by curing through a coagulation bath.

More specifically, the preparation steps thereof are as follows:

The process for preparing a flat sheet membrane includes:

Step 1: formulation of dope solutions (spinning solutions):

Dope solution (spinning solution) A: A first high molecular weight polymer, a modifier, a solvent, and an additive are mixed uniformly at a predetermined ratio to formulate the dope solution (spinning solution) A.

Dope solution (spinning solution) B: A second high molecular weight polymer, a solvent, and an additive are mixed uniformly at a predetermined ratio to formulate the dope solution (spinning solution) B.

Step 2: casting (spinning) of a dual-layer membrane:

After eliminating air bubbles, the dope solutions A and B are cast on a support carrier through a co-casting technique, and are allowed to enter a coagulation bath after a predetermined period of time to allow phase inversion, to precipitate into a dual-layer flat sheet membrane.

The process for preparing a hollow fiber membrane includes:

After eliminating air bubbles, the spinning solutions A and B, and a bore fluid are extruded from a spinneret through a co-extrusion technique, and are allowed to enter a coagulation bath after experiencing an air gap, to precipitate into a dual-layer hollow fiber membrane.

Materials Employed in the Following Experiments

P84® polyimide (HP Polymer GmbH) was employed as the material for the selective layer of the dual-layer membranes. Ultem® 1000 polyetherimide supplied by SABIC was employed as the polymer material of the support layer. N-methyl-2-pyrrolidinone (NMP) was used as the solvent, and tetrahydrofuran (THF) was used as the volatile co-solvent in the selective layer dope solution. 4-Fluoro-2-(trifluoromethyl)benzylamine (FTB, >99%, Leyan) was used to modify the P84® polyimide. Lithium chloride and silicon dioxide were acquired as additives in the support layer dope solutions. 1,6-Hexanediamine (HDA) was utilized to cross-link the dual-layer membranes. Sodium sulfate, sodium chloride, magnesium sulfate, and magnesium chloride were dissolved in aqueous solution to test the nanofiltration performance. Tetracycline and Vitamin B12 were dissolved in methanol to test the solvent-resistant nanofiltration performance.

Preparation of the Dual-Layer Flat Sheet Membranes and Hollow Fiber Membranes

The P84® dope solution added with a predetermined amount of FTB monomer, and the Ultem® dope solution were co-cast on a glass plate using coupled casting knives, and then immersed in a water coagulant bath to allow phase inversion.

The detailed steps were as follows:

The high molecular weight polymers P84 polyimide and Ultem polyetherimide were dried for 12 h in a vacuum oven at 90° C. to remove the moisture.

The P84 polyimide polymer was dissolved in the NMP solvent and magnetically stirred for 24 h to form a homogenous solution. 4-fluoro-2-(trifluoromethyl)benzylamine modifier was added to the polymer solution, and magnetically stirred for 24 h at room temperature to form the homogenous dope solution A.

The Ultem polyetherimide polymer and the LiCl additive were dissolved in the NMP solvent, heated in a water bath at 70° C., and magnetically stirred for 24 h to form the homogeneous dope solution B.

The dope solutions A and B were set still for 12 h to eliminate air bubbles.

When the phase inversion method and the co-casting technique were employed, the height of the casting knives was adjusted to 150 μm for the polymer dope solution B and 200 μm for the polymer dope solution A, the polymer dope solutions A and B were cast on a carrier (glass plate or non-woven fabric), and then immersed in a coagulation bath (pure water), and the dope solutions were precipitated into a dual-layer flat sheet membrane.

When the dry-jet wet spinning and co-extrusion technique were employed, the polymer dope solutions A and B and the bore fluid were separately extruded from a triple-orifice spinneret by syringe pumps. After experiencing an air gap, the as-spun fibers were immersed into a coagulation bath (water) to precipitate into the dual-layer hollow fiber membrane. The precipitated hollow fiber membrane filaments were collected by a take-up device, and then immersed in pure water for 2 days to replace the solvent. Then the membrane filaments were immersed in a 30% glycerol aqueous solution for 2 days, and then dried in air.

Table 1 summarizes the detailed composition and viscosity of the dope solutions.

TABLE 1

| | Top layer (TL) | | | | Bottom layer (BL) | |
|---|---|---|---|---|---|---|
| Raw materials | TL-a | TL-b | TL-c | TL-d | | |
| Polymer (wt %) P84® | 20 | 20 | 20 | 20 | Ultem® | 20 |
| Modifier (wt %) FTB | 0 | 2 | 4 | 6 | LiCl | 3 |
| Solvent (wt %) NMP | 80 | 78 | 76 | 74 | NMP | 77 |
| Viscosity (cp) | 2202 | 2067 | 1893 | 1773 | | 4218 |

Dual-layer hollow membranes were prepared by dry-jet wet spinning and co-extrusion technique utilizing a triple-orifice spinneret. The outer dope solution and inner dope solution were fed by two ISCO syringe pumps simultaneously into the spinneret, while the bore fluid was fed by a liquid chromatography pump simultaneously into the spinneret. The co-extruded dopes experienced an air gap before entering the water coagulant. The precipitated hollow fibers were collected by a take-up drum. The as-spun hollow fibers were rinsed with tap water for 2 days to remove the resident solvent. Some of the hollow fibers subscribing to the fabrication of modules were immersed in a 40 wt % glycerol aqueous solution for 2 days and then dried in ambient air. The other hollow fibers subscribing to characterization followed a solvent exchange procedure involving three-time hexane after three-time methanol to eliminate the surface tension.

Characterizations of the Membranes

Fourier transform infrared spectroscopy (FTIR) was used to analyze the chemical change of the P84® top layer incorporated with a predetermined amount of the FTB monomer. An attenuated total reflectance (ATR) mode was applied using a FTIR spectrometer (Thermo Scientific, Nicolet iS50) over the range of 400-4000 cm$^{-1}$ with the total 64 scans for each sample. To further quantify the FTB incorporated content on the P84® polyimide, elemental analysis was performed using an X-ray photoelectron spectroscopy (XPS, Escalab250Xi, Thermo Scientific).

The morphology of the dual-layer flat sheet membranes was observed by field emission scanning electron microscope (FESEM, Hitachi S4800). The cross-section morphology of the dual-layer hollow fiber membranes was observed by scanning electron microscope (SEM, Hitachi TM3000).

Figure 2:
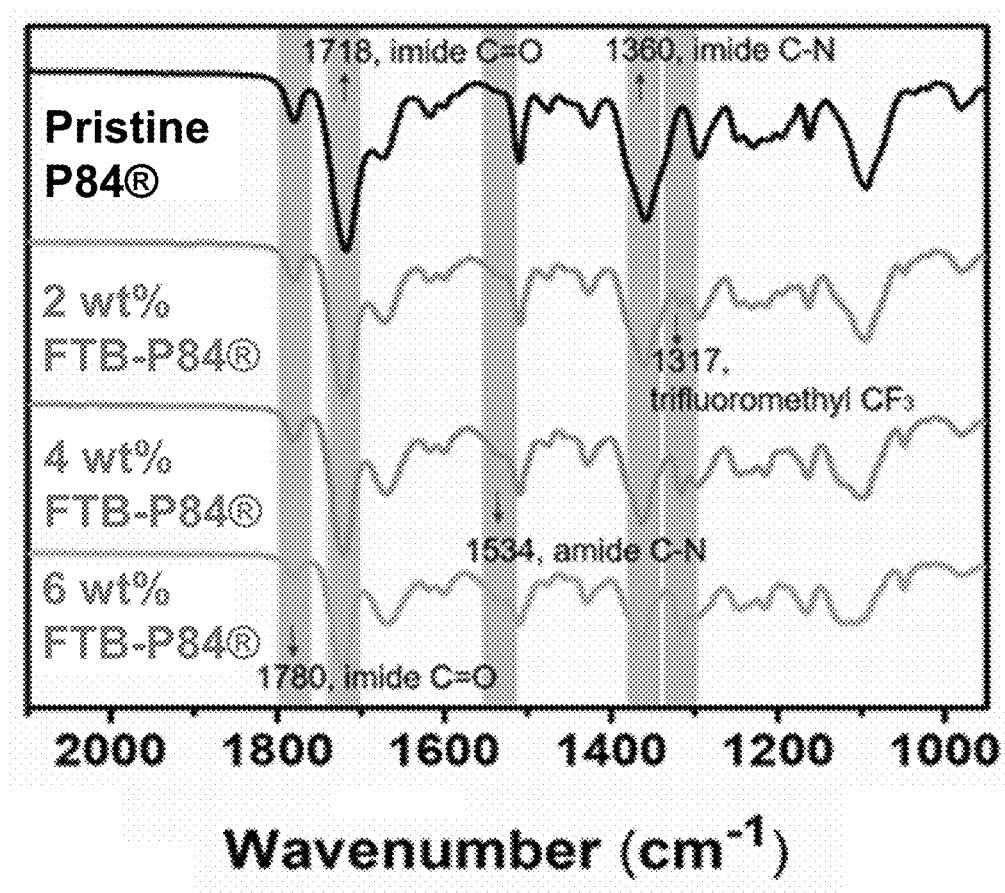
FIG. 2 shows ATR-FTIR spectra of FTB-grafted P84® membranes.

The grafting reaction between the FTB monomer and the P84® polyimide in the top layer dope solution was investigated utilizing FTIR and XPS. The signal intensities of imide bands at 1780, 1718 and 1360 cm$^{-1}$ attenuate gradually while the amide band at 1534 cm$^{-1}$ increases with the progressive increase of the FTB monomer content in the P84® dope solution (FIG. 2), indicating that the imide group in P84® reacts with the amine in FTB and forms amide groups. The reaction mechanism between the FTB monomer and the P84® polyimide is as shown above. The P84® grafted and modified with FTB is denoted as FTB-P84®. The FTB-P84® with single FTB monomer incorporated per repeat unit is denoted as S-FTB-P84 and that with double FTB monomers incorporated per repeat unit is denoted as D-FTB-P84. The incorporation of the FTB monomer introduces acylamino and trifluoromethyl units on the P84® polymer chain which can serve as proton donor and acceptor and form intermolecular interactions with carbonyl-containing polymers. It shows that through the grafting and modification with 4-fluoro-2-(trifluoromethyl)benzylamine, the characteristic peak of the imide bond of P84 polyimide is attenuated, the characteristic peak of the amide bond appears and is enhanced, and the characteristic peak of fluoromethyl appears at the same time. It is proved that the 4-fluoro-2-(trifluoromethyl)benzylamine modifier is successfully grafted on the P84 polyimide polymer chain, and fluoromethyl and acylamino groups are introduced.

Figure 3:
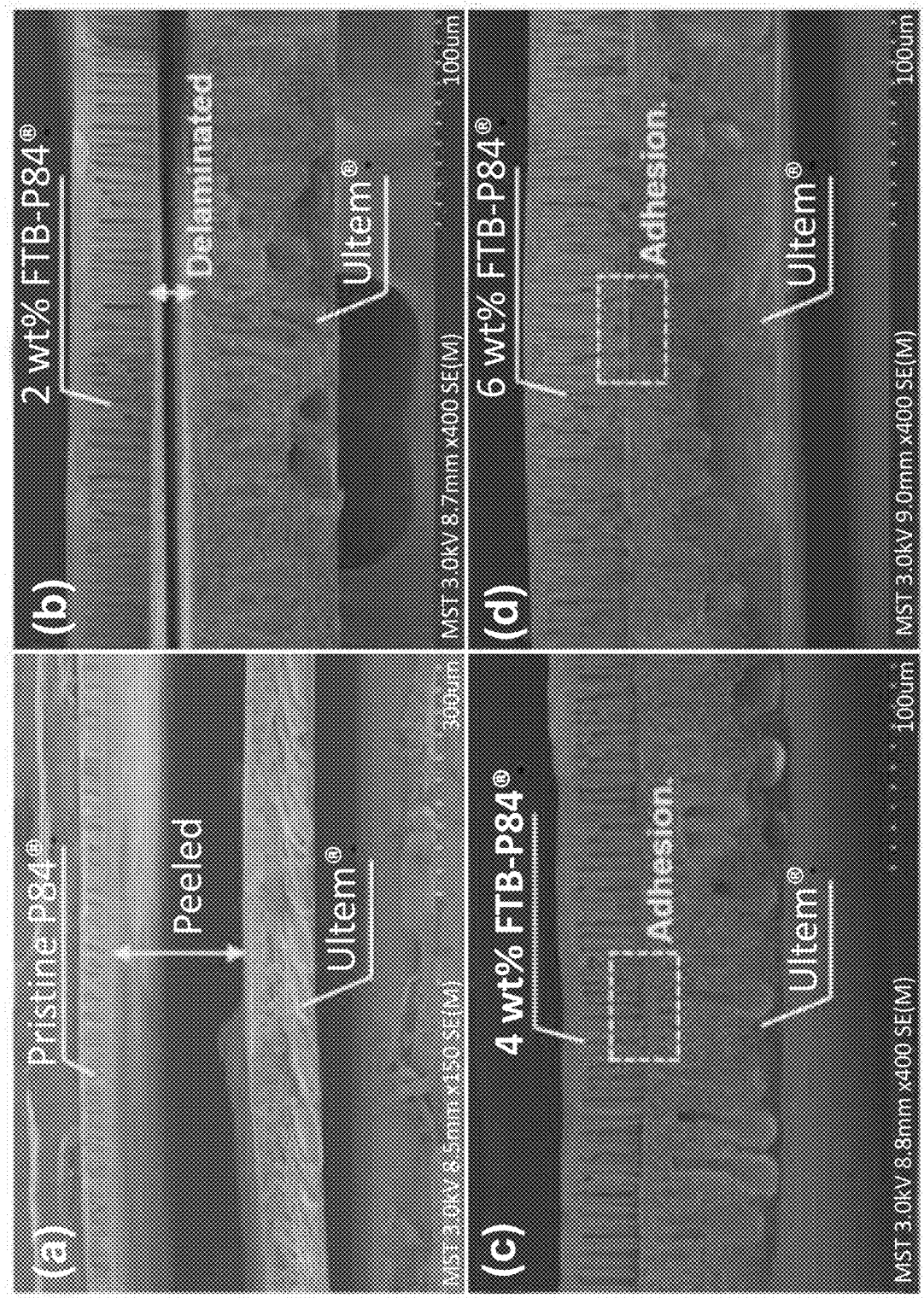
FIG. 3 shows morphology of dual-layer membranes. Top layer: region (a) of FIG. 3 shows pristine P84®; region (b) of FIG. 3 shows 2 wt % FTB-P84®; region (c) of FIG. 3 shows 4 wt % FTB-P84®; and region (d) of FIG. 3 shows 6 wt % FTB-P84®. Bottom layer: Ultem®.

The P84® dope solution containing a predetermined amount of FTB was co-cast with the Ultem® dope solution on the glass plate using coupled casting knives. Then the membrane was immersed in a coagulation bath at room temperature to allow phase inversion. FIG. 3 illustrates the morphological evolution of dual-layer membranes prepared with different FTB addition in the top layer dope solution. When the pristine P84® dope solution without adding FTB monomer was used as the top layer dope solution, the top P84® layer detached directly from the bottom Ultem® layer during coagulation in water after co-casting ((a) of FIG. 3). When 2 wt % FTB monomer was added into the top layer dope solution, macroscopic adhesion of the dual-layer membrane was achieved during the coagulation process. However, the dual-layer membrane delaminated slightly when being fractured in liquid nitrogen ((b) of FIG. 3). Further increasing the FTB monomer content in the top layer dope solution, the delamination-free interfacial region can be obtained ((c) of FIG. 3, (d) of FIG. 3). It shows that in the dual-layer membrane without the 4-fluoro-2-(trifluoromethyl)benzylamine modifier, the top P84 polyimide layer and the bottom Ultem polyetherimide layer are directly peeled off and delaminated. With the addition of the 4-fluoro-2-(trifluoromethyl)benzylamine modifier, the adhesion at the interface of the dual-layer membrane gradually increases. After a predetermined amount of 4-fluoro-2-(trifluoromethyl)benzylamine was added to graft and modify the P84 polyimide, the excellent adhesion is achieved between the top and bottom layers of the dual-layer membrane.

It can be seen that a successive morphological transition from delamination to partial attachment, and further adhesion of the dual-layer membranes can be realized with progressively increasing the incorporation of FTB monomer in the P84® polyimide dope solution. The mild and efficient approach to address the delamination issue of dual-layer membranes exhibits promising application potentials.

The illustrated method for preparing dual-layer flat sheet membranes was successfully transplanted to the preparation of dual-layer hollow fiber nanofiltration membranes by dry-jet wet spinning and co-extrusion technique. The detailed spinning conditions are shown in Table 2.

TABLE 2

| | |
|---|---|
| FTB content in the outer spinning solution (wt %) (P84 ®: 20 wt %; NMP: 74 wt %) | 6 |
| Flow rate of the outer spinning solution (ml/min) | 0.1 |
| Inner spinning solution (Ultem ®/LiCl/NMP, wt %) | 20/3/77 |
| Flow rate of the inner spinning solution (ml/min) | 2.0 |
| Bore fluid (NMP/water, wt %) | 80/20 |
| Flow rate of the bore fluid (ml/min) | 0.5 |
| Air bath distance (cm) | 3 |
| Coagulation bath | Water |
| Coagulation bath temperature (° C.) | 20 |
| Spinneret parameter (O.D./I.D., mm/mm) | Outer nozzle (1.6/1.3); inner nozzle (1.14/0.6); bore (0.44) |

A similar morphological transition from delamination to slight attachment and further adhesion can be observed with progressively increasing FTB addition ((a) of FIG. 4 to (d) of FIG. 4). The outer layer is around 5 μm with the bulk of sponge structure while the inner Ultem® layer is around 200 μm with the bulk of long finger-like macrovoids. It shows that in the dual-layer membrane without the 4-fluoro-2-(trifluoromethyl)benzylamine modifier, as shown in (a) of FIG. 4, the outer P84 polyimide layer is directly peeled off from the inner Ultem polyetherimide layer. With the addition of the 4-fluoro-2-(trifluoromethyl)benzylamine modifier, the adhesion at the interface of the dual-layer membrane gradually increases, as shown in (b) of FIG. 4. After a predetermined amount of 4-fluoro-2-(trifluoromethyl)benzylamine was added to graft and modify the P84 polyimide, the excellent adhesion is achieved between the inner and outer layers of the dual-layer membrane, as shown in (c) of FIG. 4 and (d) of FIG. 4.

To further confirm the contributions of the mutual affinity and intermolecular interaction to the interpenetration of the molecules, the morphology at the interfacial region of the dual-layer membranes with varied FTB addition was observed by SEM ((a) of FIG. 5 to (d) of FIG. 5). Large voids can be seen on the bottom surface of the top layers which verifies that the finger-like macrovoids extend from the bulk of the top layer to the bottom layer. When the pristine P84® and Ultem® dope solutions are co-cast ((a) of FIG. 5), the poor miscibility between top and bottom layer polymers hinders the mixing of the polymer molecules at the interfacial region thermodynamically, leading to limited formation of the interfacial phases. During phase inversion process, the extended macrovoids from the top layer containing a certain amount of nonsolvent grow into the interfacial region. The hydrophobic nature of the bottom Ultem® layer further retards the nonsolvent from top layer to penetrate into bottom layer. Induced by the accumulated nonsolvent, phase inversion of the newly formed interfacial phases occurs. Isolated and slightly interpenetrated structure can be seen on the top surface of the bottom layer as shown in (a) of FIG. 5. The interfacial region cannot withstand the different shrinkage of the top and bottom layers during coagulation. Thus, delamination between the pristine P84®/Ultem® dual-layer membranes happens. By incorporating the FTB monomer on the P84®, the mixing of the polymer molecules at the interfacial region enhances, which is attributed to the elevated mutual relative affinity and established specific intermolecular interactions between the top and bottom layers. Progressively improved interpenetration of the top layer polymer to the bottom layer can be observed on the top surface of the bottom layer ((b) of FIG. 5, (c) of FIG. 5, (d) of FIG. 5).

Filtration and Rejection Performance

The one-step prepared dual-layer hollow fiber nanofiltration membranes were subscribed to filtration test in both aqueous and organic solvent systems.

The separation performance of the dual-layer hollow fiber membranes was evaluated in terms of pure water permeability, methanol permeability and solute rejection using a lab-made filtration system. Pure water and methanol permeate samples were collected as a function of time, and the solvent permeance (P, L m$^{-2}$ h$^{-1}$ bar$^{-1}$) was calculated according to the following equation:

$$P = \frac{\Delta V}{A \cdot \Delta t \cdot \Delta p}$$

where $\Delta V$ (L) is the volume of the permeate collected in the time period $\Delta t$ (h) under a trans-membrane pressure $\Delta p$ (bar), and A (m$^2$) is the effective membrane area.

The solute rejection test in aqueous system was carried out using 1000.0 mg L−1 aqueous solutions of Na$_2$SO$_4$, NaCl, MgSO$_4$ and MgCl$_2$, respectively. The solute rejection test in the solvent system was carried out using 50.0 mg L$^{-1}$ methanol solutions of Vitamin B12 and tetracycline respectively. The solute rejection was calculated according to the following equation:

$$R = \left(1 - \frac{C_p}{C_f}\right) \times 100\%$$

where $C_p$ and $C_f$ denote the solute concentrations in the permeate and feed solutions, respectively. Concentrations of salts and pharmaceuticals in feed and permeate were measured by a conductivity meter (Mettler-Toledo) and a UV-vis spectrophotometer (AOE), respectively.

The pure water permeance of the dual-layer hollow fiber membranes is affected by the FTB addition in the top layer dope solution ((a) of FIG. 6). The rejections of the four salts follow the order of Na$_2$SO$_4$>NaCl>MgSO$_4$>MgCl$_2$ ((b) of FIG. 6). Especially when the FTB addition was controlled at 4%-6%, a rejection of 80% or more for Na$_2$SO$_4$ and 50% or more for NaCl can be obtained. The 4 wt % FTB incorporated dual-layer membranes were further applied in recovering pharmaceuticals in organic solvents. The membranes exhibit 99% rejections of both the tetracycline and Vitamin B12 in methanol solution with pure methanol permeance of 3.7 LMH/bar ((c) of FIG. 6, (d) of FIG. 6).

Solvent Resistance Test

To further verify the molecular mixing at the interfacial region of the dual-layer hollow fiber membranes and explore the resistance of the dual-layer hollow fiber membranes in organic solvents, the prepared dual-layer hollow fiber membranes were cross-linked with 1,6-hexanediamine for 15 h and immersed in DMF for 2 weeks. As can be seen in (a) of FIG. 7, the cross-linked pristine P84®/Ultem® dual-layer hollow fiber membranes delaminated after DMF immersion. The 4 wt % FTB-P84®/Ultem® dual-layer hollow fiber membranes after cross-linking remained delamination-free after two-week immersion in the DMF solvent, indicating that FTB incorporated P84® and Ultem® molecules at the interfacial region of the dual layers are mixed well which can be chemically cross-linked by HDA. (b) of FIG. 7 illustrates the possible reactions exist in the outer layer, inner layer and the interfacial region of the dual-layer membranes. The cost efficient dual-layer hollow fiber membranes which can maintain structural integrity in harsh solvents exhibit vast application potentials in the fields of organic solvent nanofiltration and reverse osmosis.

What is claimed is:

1. A dual-layer membrane, comprising a layer of a first polymer and a layer of a second polymer, and the layer of the first polymer further comprises a modifier, wherein the modifier is a fluoro substituted aromatic amine monomer containing fluoro or fluoromethyl and amino groups.

2. The dual-layer membrane according to claim 1, wherein the first polymer is a high molecular weight polymer containing an imide structure, and the second polymer is a high molecular weight polymer containing a carbonyl group, a carboxyl group or an ether bond.

3. The dual-layer membrane according to claim 1, wherein the first polymer comprises polyimide, polyetherimide, or polyamideimide, and the second polymer comprises polyetherimide, polyethersulfone, or polysulfone.

4. The dual-layer membrane according to claim 1, wherein the modifier is 4-fluoro-2-(trifluoromethyl)benzylamine.

5. The dual-layer membrane according to claim 1, wherein the dual-layer polymer membrane is of a flat sheet type or a hollow fiber type; and the dual-layer membrane comprises a microfiltration membrane, an ultrafiltration membrane, a nanofiltration membrane, a reverse osmosis membrane, a pervaporation membrane, a vapor permeable membrane, a gas separation membrane or a forward osmosis membrane.

6. A method for preparing the dual-layer membrane according to claim 1, wherein the method comprising the following steps:

step 1: formulating the first polymer, the modifier, a first solvent, and a first additive into a first solution;

step 2: formulating the second polymer, a second solvent, and a second additive into a second solution; and step 3: applying the first solution and the second solution in a manner of overlapping each other, followed by phase inversion, to obtain a dual-layer polymer membrane.

7. The method for preparing the dual-layer membrane according to claim 6, wherein the step 3 is configured for preparing a flat sheet separation membrane, and the step 3 for preparing the flat sheet separation membrane comprises the following steps: casting the first solution and the second solution on a support carrier through a co-casting technique to form a membrane, and allowing the membrane to enter a coagulation bath after a predetermined period of time to allow the phase inversion, to precipitate into a dual-layer flat sheet membrane; or the step 3 is configured for preparing a hollow fiber membrane, and the step 3 for preparing the hollow fiber membrane comprises the following steps: extruding the first solution, the second solution and a bore fluid from a spinneret through a co-extrusion technique, and allowing the co-extruded first solution, second solution and bore fluid to enter a coagulation bath after experiencing an air gap, to precipitate into a dual-layer hollow fiber membrane.

8. The method for preparing the dual-layer membrane according to claim 6, wherein the first polymer, the modifier and the first additive in the first solution have content ranges of 10-35%, 0.1-20%, and 0-40%, respectively; and the second polymer and the second additive in the second solution have content ranges of 10-35%, and 0-20%, respectively.

9. The method for preparing the dual-layer membrane according to claim 6, wherein the first solvent or the second solvent is one of NMP and THF, or a mixture of both thereof, and the first additive or the second additive is LiCl.

10. The method for preparing the dual-layer membrane according to claim 7, wherein the coagulation bath is water.

* * * * *